(No Model.)
R. COWEN.
METHOD OF REPAIRING PNEUMATIC TIRES.
No. 497,634. Patented May 16, 1893.
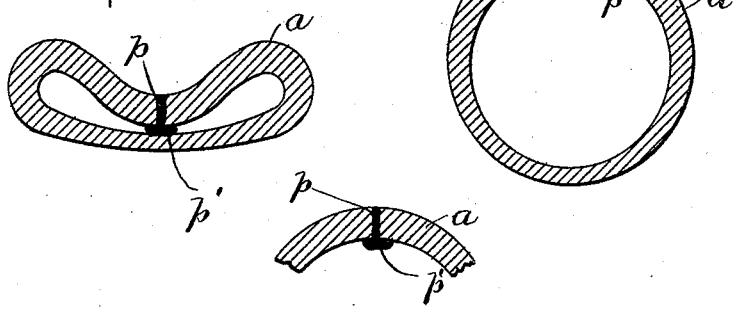
WITNESSES:
H. A. Hall
W. S. McLeod
INVENTOR:
Robert Cowen
by Wright Brown Crossley
Attys.
THE NORRIS PETERS CO., PHOTO-LITHO., WASHINGTON, D. C.

UNITED STATES PATENT OFFICE.

ROBERT COWEN, OF CAMBRIDGE, MASSACHUSETTS.

METHOD OF REPAIRING PNEUMATIC TIRES.

SPECIFICATION forming part of Letters Patent No. 497,634, dated May 16, 1893.

Application filed September 1, 1892. Serial No. 444,737. (No specimens.)

*To all whom it may concern:*

Be it known that I, ROBERT COWEN, of Cambridge, in the county of Middlesex and State of Massachusetts, have invented certain new and useful Improvements in Methods of Repairing Pneumatic Tires, of which the following is a specification.

This invention has for its object to enable a small puncture or fracture in a pneumatic tire to be quickly and durably closed, and in such manner that there will be no protuberance on the external surface of the tire, and no liability of the reopening of the puncture by the action of solar heat.

The invention consists in the improved method hereinafter described and claimed.

Of the accompanying drawings forming a part of this specification, Figure 1 represents a transverse section of a pneumatic tire, showing a puncture through the wall of the tire. Figs. 2, 3 and 4 represent similar views, showing different stages of the operation. Fig. 5 represents a section showing the tire after the completion of the repairing operation.

The same letters of reference indicate the same parts in all of the figures.

In the drawings—$a$ represents a pneumatic tire and $a'$ a puncture therein.

In carrying out my invention I close the puncture by injecting into it a plug $p$ composed of a material or composition which is rendered plastic and adhesive by a degree of heat considerably exceeding that caused by the sun; but becomes elastic without being plastic when exposed to maximum degrees of solar heat, say about 110° Fahrenheit or less, a suitable material or composition being unvulcanized rubber gum. The plastic plug may be conveniently injected into the puncture by heating the composition or gum in a syringe or cylinder $s$ having an attenuated nozzle $s'$ formed to be inserted in the puncture, and when the gum is in a hot plastic state exerting pressure upon it by means of a piston $s^2$ and levers $s^3$ $s^3$ arranged to act on said piston, the piston cylinder and levers constituting a tool which is the subject of an application for Letters Patent of the United States filed by H. H. Cummings and myself June 13, 1892, Serial No. 436,425. The cylinder may be heated by subjecting it to the flame of an alcohol lamp. The nozzle is inserted a sufficient distance into the puncture, and then the hot plastic material is caused to exude in the form of a plug $p$ into the puncture, the nozzle being withdrawn during the operation, so that the plug entirely fills the puncture, the material of the plug being cut off about flush with the external surface of the tire. It will be seen that the plastic and adhesive condition of the plug when it is first injected, causes it to conform and adhere closely to the walls of the fracture, the plug subsequently hardening sufficiently to resist the air pressure and the softening action of solar heat. I prefer to extend the plug inwardly into the interior of the tire, as shown in Figs. 2 and 3, and flatten the projecting end of the plug against the inner surface of the tire, thus forming a head $p'$ on the inner end of the plug. Said head may be conveniently formed by indenting the tire, as shown in Fig. 4, until the inner end of the plug comes in contact with the inner surface of the tire, this being done while the plug is in a plastic condition. The head prevents liability of the plug being forced outwardly and, by reason of its large area, in contact with the inner surface of the tire, makes the plug more effective.

I am aware that it has been proposed to inject rubber cement in a liquid form into punctures in pneumatic tires; but said cement, containing a volatile solvent of rubber, is liable to deteriorate more rapidly than rubber gum, and is also liable to be softened and rendered useless by solar heat. Moreover, the rubber cement cannot be manipulated in such manner as to form a head on the inner surface of the tire.

I claim—

1. The improved method of repairing pneumatic tires, the same consisting in injecting into the hole or fracture to be repaired a plug composed of a material or compound, substantially such as unvulcanized rubber gum, rendered plastic and adhesive by heat and thereby caused to adhere firmly to the walls of the fracture, the plug becoming elastic when cooled, and being capable of resisting the softening action of solar heat, as set forth.

2. The improved method of repairing pneumatic tires, the same consisting in injecting into the hole or fracture to be closed, a plug composed of a material or composition substantially such as unvulcanized rubber gum, rendered plastic and adhesive by heat, the inner end of the plug projecting into the interior of the tire, and then while the plug is in a plastic condition forming its inner end into a head bearing against the inner surface of the tire, as set forth.

In testimony whereof I have signed my name to this specification, in the presence of two subscribing witnesses, this 23d day of August, A. D. 1892.

ROBERT COWEN.

Witnesses:
ARTHUR S. SUTTLER,
K. J. FENNO.